May 7, 1963   C. P. PORTERFIELD ET AL   3,089,059
HIGH REPETITION RATE SPARK MACHINING APPARATUS
Filed July 2, 1959   3 Sheets-Sheet 1

INVENTORS
CECIL P. PORTERFIELD
ROBERT W. DRUSHEL
BY
Wolfe, Hubbard, Voit + Osann
ATTYS

United States Patent Office 3,089,059
Patented May 7, 1963

3,089,059
HIGH REPETITION RATE SPARK MACHINING APPARATUS
Cecil P. Porterfield and Robert W. Drushel, Pittsburgh, Pa., assignors, by mesne assignments, to Elox Corporation of Michigan, Troy, Mich., a corporation of Michigan
Filed July 2, 1959, Ser. No. 824,503
23 Claims. (Cl. 315—180)

This application relates to spark machining apparatus particularly useful at high spark repetition rates.

In spark machining overvoltage initiated electric discharges through an ionizable dielectric fluid in a spark gap defined between a cathodic electrode tool and an anodic conductive workpiece dislodge particles from the latter. By advancing the electrode tool as the machining proceeds to maintain a normal range of spark gap spacing, the workpiece is effectively machined in a cut or pattern complementary to the configuration of the facing electrode tool surface. This process is particularly advantageous for working hard metals, such as tungsten carbide and alloy steel which are machined only with difficulty if at all by economic conventional procedures. To prevent deterioration of the discharge into a thermal or welding arc which might thermally damage the workpiece surface, the discharges are short and time spaced. At the same time, however, in the interests of high speed metal removal, both high discharge current levels and high repetition rates remain an objective.

Usually, a capacitive storage means has been charged during the intervals between discharges to provide a low-internal impedance energy source capable of providing the high peak discharge currents. Switches have been previously variously employed in capacitive charging or discharging circuits or both to better control the discharge timing and prevent direct connection of the capacitor charging source to the gap. They also present problems of their own in contact erosion or operation at high repetition rates and high currents.

It is the principal object of the present invention to provide high-repetition rate spark machining equipment requiring no switching devices. Stated in another way it is an object of the present invention to provide simple and effective spark machining equipment effective for a wide range of machining rates.

More particularly, it is an object to provide high repetition rate spark machining apparatus with assured spark gap deionization between discharges.

Another object is to provide in a spark machining apparatus protection against metallurgical damage during short circuiting of the spark gap.

Another is to provide accurate and exact control for uniform cutting and surface finish.

Another object is to provide spark cutting apparatus in which the peak currents in the spark gap circuit during short circuiting of the workpiece and electrode are lower than peak discharge currents during normal cutting.

Other objects and advantages will become apparent as the following description proceeds, taken in conjunction with the accompanying drawings, in which.

While the invention has been shown and is described in some detail with respect to particular embodiments and modifications thereof, there is no intention that it should be limited to such detail. On the contrary, it is intended here to cover all modifications, alternative constructions and equivalents falling within the spirit and scope of the invention as defined by the appended claims.

In the circuits about to be described, a high frequency alternating source is applied through a rectifier to a storage capacitor of a discharge circuit which includes the spark cutting gap. An obvious advantage of such an arrangement is the time-spacing between the forward half cycles afforded by the fact that the reverse half cycles are blocked.

Time separation of the applied voltage pulses, however, is not the complete answer to the problem. The nature of the sparkover discharge demands recognition of the fact that sparkover does not always begin precisely at the same instant with respect to the applied voltage or require the same time duration of voltage application. Part of this problem lies in the departure from perfection of the feed means for maintaining the gap spacing precisely and instantaneously constant. At best, however, the occurrence of an overvoltage initiated discharge for a measurable given spacing is predictable upon a statistically averaged basis. To some extent, the breakdown follows a volt-time product amplitude rather than voltage amplitude alone. The local purity of the fluid dielectric may play a role. The concentration of dislodged particles or other contaminants is significant.

The following description relates in particular the manner in which the regular timing of applied pulses afforded by the use of an alternating source is reconciled with the irregular timing usually to be expected of the discharge without undue loss of efficiency of utilization of the source, on the one hand, or loss of uniformity of discharges and limitation of short-circuit damage on the other hand.

Because the apparatus is adaptable for different cutting speeds and degrees of finesss of finish, the construction and operation is explained here in terms of representative circuit structure and performance designed to produce different cutting speeds and finishes. These include at one extreme a high speed, relatively rough-cutting arrangement particularly useful for bulk removal as at the start of a machining operation. At the other end of the scale is a fine-finish, relatively slow-speed arrangement particularly designed for very smooth finishes, as, for example, for dies. Various intermediate speeds may be employed, the circuit lending itself readily to various switch-connected changeovers which for the sake of clarity need not be illustrated here. Any one circuit mode or combination of circuit modes may be selected for particular installations as desired.

Figures 1, 1A:
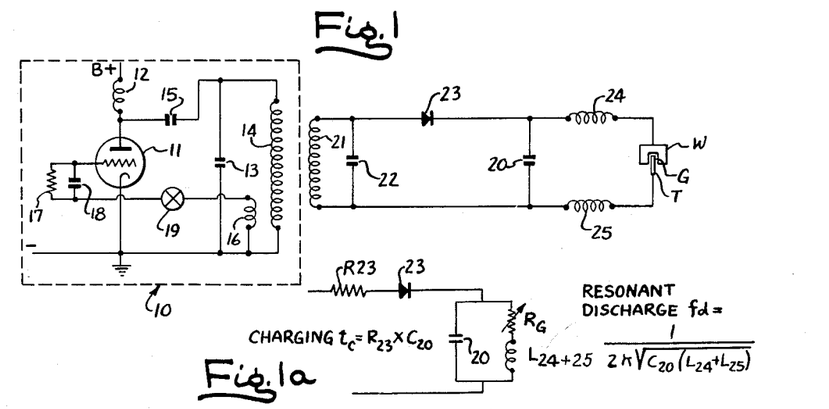
FIGURE 1 is a circuit diagram of a fast or rough cutting spark machining apparatus embodying the invention.
FIG. 1a is a simplified schematic representation of part of the FIG. 1 apparatus illustrating the charging time constant and discharge electrical resonance.
Figures 2, 3:
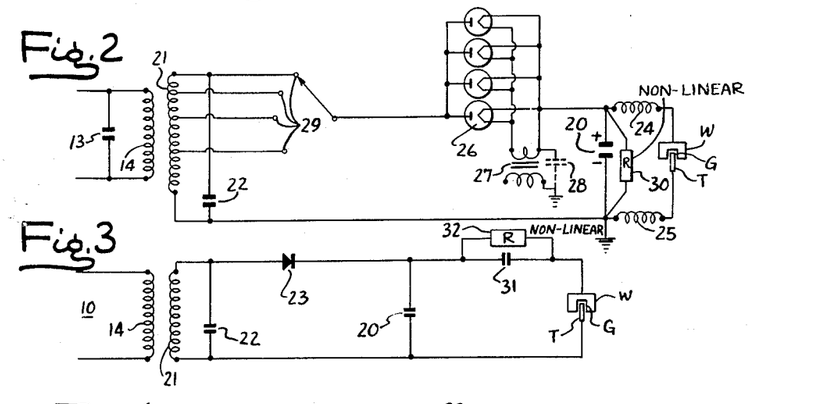
FIG. 2 is another version of the FIG. 1 apparatus.
FIG. 3 is a circuit diagram of a fine finish cutting spark machining apparatus embodying the invention.

(1) *The Apparatus of FIGS. 1 and 2*

The apparatus illustrated in the circuit diagrams of FIGS. 1 and 2 is at the high removal speed end of the scale.

A suitable alternating current source as incorporated in the illustrated circuits is shown in detail in FIG. 1. It desirably takes the form of an electronic tube power oscillator 10 rather than a rotary machine alternator because of economy of construction and freedom from maintenance at frequencies which are high relative to conventional sixty cycles per second line frequencies. Frequencies of the order of ten or more kilocycles are useful high frequencies with such oscillators, and the term "high frequency" is so defined here. The design choices involved in the illustrated embodiments are made in favor of a 40 kilocycle frequency for the different cutting speeds and finish fineness sought with a 5 kilowatt rating. This is not a limiting frequency or power; other oscillators have been employed with the spark cutting apparatus operating at frequencies varying from 10 kilocycles to 220 kilocycles. The internal impedance of such a power source is presented by an oscillator tuned output or tank circuit. It is not a "stiff" voltage source (i.e., it does not have good voltage regulation) but the connected load of the overall spark machining circuit accommodates this characteristic despite its high peak discharge currents.

The particular self-excited oscillator 10 illustrated in FIG. 1 is also chosen for stability, operator safety, and convenience of control. The oscillator electric valve or tube 11 is a vacuum triode energized by a direct current source 12. As is conventional, the positive or B+ terminal is connected through a choke to the triode anode and the ground or negative terminal is connected to the cathode. A tuned output tank comprising a capacitor 13 and inductive coil or winding 14 resonant at the exemplary 40 kilocycle frequency choice is coupled to the triode anode by a capacitor 15. Regenerative feedback from the tank to the triode grid is controlled principally by grid winding 16 and a grid-leak resistance-capacitance combination 17, 18. With such an alternator as a source, a switching device 19 in the very low power grid circuit conveniently serves to stop or start the oscillator.

Energy from the oscillator of FIG. 1 is transmitted at a useful voltage level to a storage capacitor 20. Oil-filled capacitors, preferably having a direct current voltage rating several times higher than the peak oscillator voltage are suitably employed. If the capacitance is to be adjustable, a bank of capacitors may be selectively switched in parallel or series according to the balance of cutting speed and finish requirements desired.

In order to couple the oscillator tank to the capacitor 20, a link comprising a winding 21 is air-core coupled to the oscillator tank winding 14. The two windings thus act as a transformer, usually with a voltage step-down turns ratio from the tank primary circuit to the link secondary circuit. A small-value capacitor 22 (i.e., having a small capacitance with respect to that capacitance of capacitor 20) remains connected across the winding 21. It helps to correct the wave form distortion produced by the half-wave load without materially increasing the oscillator rating required for a given power delivery to the storage capacitor 20.

An important part of the link between the power oscillator 10 and capacitor 20 is rectifier or unidirectional conducting means 23. It functions to block alternate half waves so that charging voltage is not applied to the capacitor 20 except during the forward half cycles. Silicon or other semi-conductor diodes are selected to present a very low resistance (separately indicated as $R_{23}$ in the simplified representation of FIG. 1a) to forward current flow, a characteristic best represented by semiconductor devices such as silicon diodes. The time constant (the product of the rectifier ohms forward resistance times the storage capacitor farads) should not exceed the oscillator half cycle period. If the capacitor voltage is to approach the source voltage peak in a single pulse charge, the time constant should be much less in order that the voltage of the capacitor 20 during charging can closely follow the link voltage.

The storage capacitor 20 is in turn connected through conductors 24 and 25 to the gap G defined between the conductive workpiece W and electrode tool T to define the discharge circuit. Automatic tool feed means (not shown) are conventionally employed to maintain the gap spacing at a normal cutting value as exactly as practicable, usually in response to changes in the integrated gap voltage or current or both. Kerosene or other self-restoring ionizable dielectric fluids flood the gap to entrain and carry away removed particles as well as to establish gap electrical characteristics prerequisite to short, high-current discharges.

Both direct current polarity and alternating current resonance of the discharge circuit are of concern. Thus, conductor 24 connects the workpiece W to the positively charged terminal of the capacitor 20 and conductor 25 connects the electrode tool T to the negatively charged terminal. Inductance is inevitably present, being represented by the most part by that distributed inductance $L_{24}$ and $L_{25}$ of the conductors 24 and 25. As more simply represented in FIG. 1a, the discharge circuit preferably is resonant at a frequency, $$F_d = \frac{1}{2\pi\sqrt{(L_{24}+L_{25}) \times C_{20}}}$$

when the gap G is bridged by a discharge. The gap during that time is indicated in FIG. 1a as a resistance $R_G$. This resistance value decreases with current increase (hundreds of amperes discharge presents less than thirty volts drop). Peak discharge current is only slightly limited by the gap resistance and is proportional to $$\frac{E_c}{\frac{\sqrt{L_{24}+L_{25}}}{C_{20}}}$$

where $E_c$ is the voltage of capacitor 20. A very much higher leakage resistance (due to contamination of the dielectric and the input resistance of the tool feed means) across the gap limits discharge circuit current to a negligible value in the absence of ionization of the working gap.

The discharge circuit resonant frequency $F_d$ is made greater than the oscillator frequency (which is the tuned frequency of the loaded tank 13, 14). This is readily accomplished by making the conductors 24 and 25 of suitable length. If the discharge circuit were tuned to a frequency equal or less than that of the oscillator, a condition all too easily encountered in the high frequency operations contemplated, prolonged or sustained discharges carrying the negative or inverse half cycles would be likely. The resulting thermal or welding type arc would defeat rather than enhance the spark cutting process.

In accordance with a particular further aspect of the invention, the discharge circuit of the FIG. 1 is tuned to resonate at a frequency only slightly higher than that of the oscillator. In one example, with a 40 kilocycle oscillator, a discharge circuit resonance at 50 kilocycles provided optimum rough-cutting efficiency. Analyzed in timing of the individual discharge, as described in detail in the following section, the resonant discharge half cycle period is 10 microseconds, or 80% of the 12.5 microseconds oscillator half-cycle period. The tuning adjustment is conveniently made by lengthening the conductors 24 and 25, which are suitably a cable from an electrical unit console to a mechanical unit supporting the workpiece and tool. The low gap resistance $R_G$ keeps the tuning conveniently broad.

FIG. 2 represents a modified version of the FIG. 1 circuit for accommodating high charging currents at high oscillator frequencies in the absence of economically available and reliable semiconductor diodes 23 for such ratings.

Accordingly, a bank of parallel-connected vacuum diodes 26 is illustrated in FIG. 2 as especially suitable for this purpose. Single vacuum tube diodes are also made in large current ratings and with a low forward drop, but in this illustrated instance, with charging current flows in the vicinity of 100 amperes desired, a bank of 168 type 5U4 dual-diode vacuum tubes was found entirely feasible and economic in place of lesser numbers of currently available larger diode devices. Gas-filled tubes are generally unsuited because of lower inverse voltage ratings or deionization time requirements. Vacuum diodes are advantageously employed rather than vacuum triodes since no grid control is required. Triodes usually have higher anode to cathode spacings, and are more expensive. The filaments of the vacuum diodes are suitably heated from a shop line alternating current source through a filament transformer 27. Some distributed capacitance 28 to ground is thus introduced but presents no problem since it merely shunts the normally very much larger capacitance of capacitor 20. The resistance of the 336 diode sections thus parallel is not linear (it tends to increase when the voltage increases) and need not be.

To overcome the resistance of the bank of diodes 26, a link voltage substantially higher than the desired peak normal capacitor voltage is employed. For example, to charge the capacitor 20 up to 150 to 200 volts during one charging pulse for rough or fast cutting applications with a 4 microfarad capacitor 20 and the 40 kilocycle oscillator 10 previously describer, a 450 volt peak no-load voltage of the link 21 has been employed. The high peak sinusoidal voltage from the oscillator link serves to provide a much higher charging rate of the capacitor 20 than would a 150 to 200 volt peak link voltage. In such a case, the working voltage to which the capacitor is charged is typically less than the time constant proportion (70.7%) of the source peak voltage. Selection of the peak voltage it be applied is easily facilitated through a plurality of taps 29 on the link winding 21. By way of illustration in the illustrated embodiment, the tap winding turns were selected to provide no load peak voltages of 200, 250, and 350 volts in addition to the 450 volt tap shown connected to the diodes 26.

However, without voltage limiting means and in the case of open circuit conditions, the capacitor voltage rises during successive charging half cycles until it closely approaches the link value. Discharges may then occur across a larger gap spacing than could occur if the capacitor voltage was limited to 150 volts. The discharge energy, proportional to the square of the voltage of the stored charge, is also much larger, causing a larger removal per discharge. Either of these represents non-uniform operation. Short circuit current will also be higher in the event a short circuit occurs at the higher voltage level.

In order to assure uniformity of finish during any selected cutting conditions, the voltage applied across the capacitor is preferably limited after it has reached the value normally attainable during a normal single charging half cycle. The limiting device is a resistor 30 connected across the capacitor 20, preferably directly at the capacitor terminals. Its resistance is non-linear in that current increases through the resistor as an exponential power of the voltage across it. Such materials are typically represented by the commercial silicon carbide product marketed as "Thyrite" resistors by the General Electric Company and for which the higher-than-unity exponent is a plural number in the vicinity of four or higher.

The dimensions of the voltage-limiting resistance 30, which is usually specified as a number of commercial units of given size and exponent, are selected in terms of the desired gap-voltage limitation desired. Thus with 150 volts as the maximum, and with a non-linear material having an exponent of 5, for example, voltage increase to 200 volts would result in a leakage discharge current through the resistor more than four times that at 150 volts. The effect is to rapidly limit the tendency of the capacitor voltage to increase above a given absolute voltage level. Significantly, cumulative increase of the capacitor voltage over successive open-circuit pulse periods is prevented because the resistance is low only when the voltage is high. If a conventional fixed resistor were employed, it would have to have a low enough resistance to discharge the capacitor 20 completely between open-circuit charge periods in order to limit the voltage successfully. Obviously, such a low resistance leakage path also defeats fast charging of the capacitor 20.

*Operation of the Apparatus of FIGS. 1 and 2*

The curves of FIGS. 5a–5e illustrate both the circuit operation and design considerations involved in selecting component values for the apparatus of FIG. 2 (and also for FIG. 1). A surprisingly high degree of uniformity of discharge energy and utilization of each oscillator half cycle is obtained with resort to timed discharge switching means.

Figures 5A, 5B:
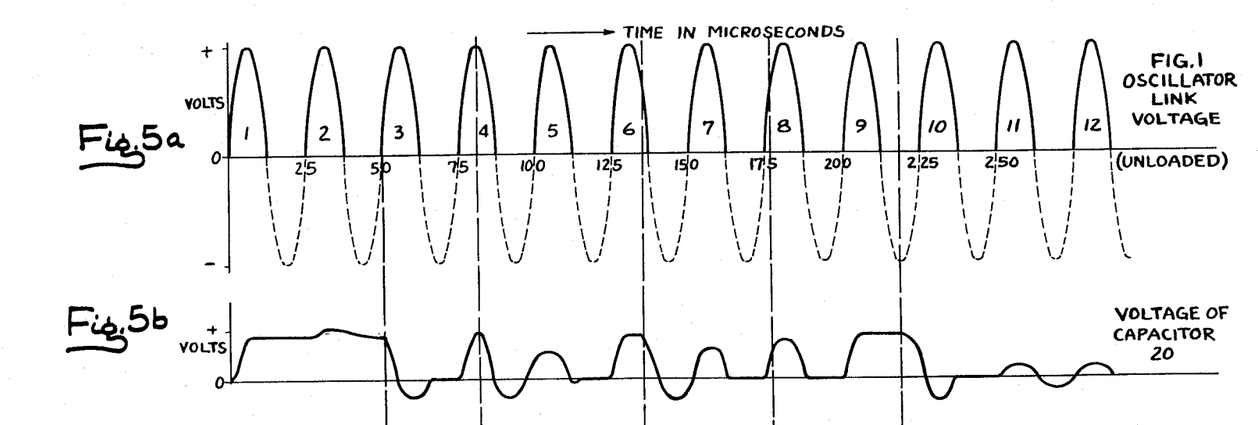
FIGS. 5a–e compare the FIG. 1 circuit oscillator voltage, capacitor voltage, capacitor current, gap voltage and gap current, respectively, over a wide range of operating conditions.

Comparison of the several significant circuit voltage and current conditions is facilitated by FIG. 5a, which sets the time scale. This figure illustrates several (in this case 12) of the oscillator cycles at 40 kilocycles, or 25 microseconds per cycle. The sinusoidal curve of FIG. 5a represents the unloaded voltage across the link winding 21. For the FIG. 1 circuit with the very low resistance rectifier 23, the peak oscillator link voltage may be selected in the vicinity of 200 volts, a voltage of 150–200 volts representing a desirable maximum value at the gap for normal spacings. For the FIG. 2 circuit, a higher link voltage is required to produce the same gap voltage in a single charging pulse because of the higher resistance of the diodes 26. Accordingly a tap 29 for providing a peak (unloaded) link voltage of 450 volts is provided. Some distortion of the wave shape (not shown) is suffered under various load conditions but this is more significantly appraised at the storage capacitor and spark gap electrodes. The inverse or blocked half-cycles are shown by broken lines and represent the potentially available gap deionization period. The forward half cycles or charging pulses are numbered 1 to 12 for convenience of the reader in following the analysis.

*Open Circuit Conditions*

The first two half cycles or pulses 1 and 2 of FIGS. 5a–5e represent open circuit conditions during which the gap G is too widely spaced to permit sparkover at the voltage or voltage-time products involved. This condition occurs, for example, when the tool T has been backed away rapidly to break a short circuit. Open circuit conditions also are shown for pulse 9.

As shown in FIG. 5b, the uncharged capacitor 20 is charged to a level between 150 and 200 volts during pulse 1 and remains there. The use of the non-linear resistance 30 of FIG. 2 affords a particularly advantageous manner of providing uniformity of finish with a minimum loss of cutting rate. With the same high storage capacitance (4 microfarads) as in the FIG. 1 operation, the FIG. 2 circuit operates to limit the voltage on the storage capacitor, during open circuit conditions to approximately the same level as for the FIG. 1 circuit. Because the resistance 30 is desirably non-linear in the voltage-limiting sense described, its effect is not particularly noticeable during the lower capacitor voltages. An initial rapid charging rate is thus maintained. The overall effect is to provide a capacitance voltage-time charging characteristic in which the charging rate is very steep until it reaches a sharp bend or knee after which it remains at nearly the same level with but slight decay.

Figure 5C:
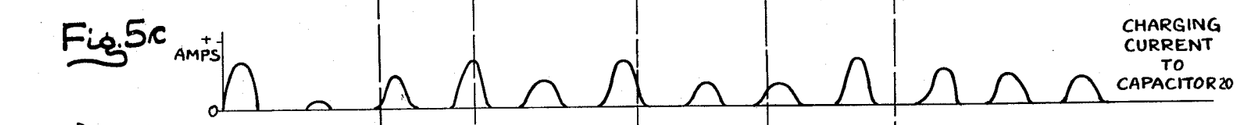
Figure 5D:
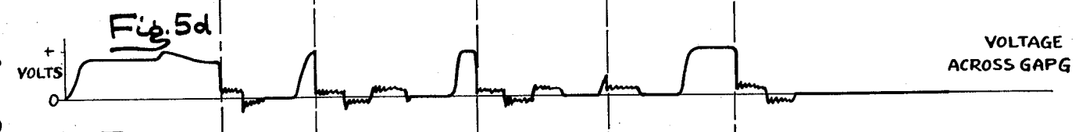
Figure 5E:
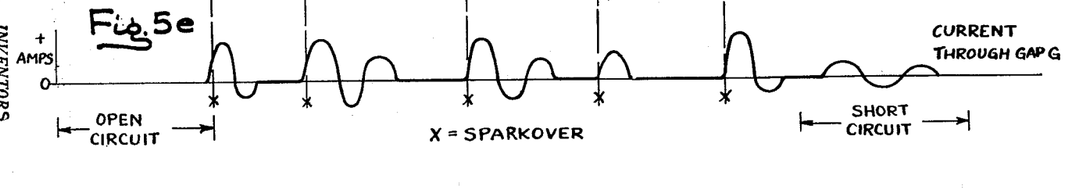

Current flows into the storage capacitor during the first charging pulse in FIG. 5c, as the capacitor voltage rises. A very small current may flow into capacitor 20 during the peak portion of pulse 2 due to leakage-current drop of the capacitor voltage between charging pulses. The gap voltage, inasmuch as the gap is not conducting, follows the capacitor voltage as shown in FIG. 5d. There is no gap current during open circuit conditions as shown in FIG. 5e.

The energy accumulated during the open circuit cycles is eventually discharged when the gap conditions permit.

The limitation of the gap voltage desirably controls the maximum gap spacing at which sparkover can occur since the complementary relation of the contour of the workpiece to that of the tool is less precise when discharge occurs at wide spacings. And, of course, should the capacitor voltage rise from pulse to pulse until breakdown occurs, the resulting high energy of the discharge defeats uniform removal per discharge in applications where open-circuit conditions are likely to be encountered.

*Normal Cutting Conditions*

Pulses 3–8 and 10 illustrate the range of conditions met during normal cutting when the spark gap is maintained in the desired or normal spacing range. Sparkover may occur at as low gap potentials, such as 40 volts. It might also await the voltage rise to the vicinity of 150 volts, especially in view of the very small volt-time products involved.

So long as the discharge circuit is tuned to a frequency higher than that of the source, the irregular timing of sparkover has only a limited affect on the uniformity of discharge. Thus, if sparkover occurs late in the pulse, the energy stored in capacitor 20 is available for the discharge. If sparkover occurs early in the cycle, the energy from the oscillator is supplied directly to the gap for the remainder of the charge half cycle. The energy storage capacitor thus in addition serves as a regulating or compensating means for the irregular discharge timing, and is advantageously so employed with the rectified alternating voltage source whether the discharge circuit resonant frequency is only slightly higher or many times higher than the oscillator frequency.

A particularly significant compensating or regulating action is realized as the discharge circuit resonant frequency approaches—but remains slightly higher than—the oscillator frequency. This is illustrated by the 50 kilocycle discharge resonant frequency of the apparatus operation here described. Under these conditions, the important positive first half cycle of discharge energy is prolonged for most (80%) of the full oscillator charging pulse period. Sparkover occurring near the end of the charging half cycle is still followed by a full-time useful discharge. A discharge of very nearly constant duration, regardless when sparkover occurs, is thus obtained. The negative excursion (during which the electrode tool is positive with respect to the workpiece) is also prolonged, but tool wear disadvantage is overweighed by the improved performance over conventional cutting power generators and the resulting high cutting rates. This regulating action is in one sense a synchronizing action since it restores the desired conditions necessary for uniform, positive discharge current pulses. It does not, however, permit the undesirable type of oscillatory synchronism in which the negative current pulses are established.

FIG. 5a illustrates a variety of instantaneous times to which breakdown may occur. As will be noted from FIGS. 5b, 5c, 5d and 5e, irregular sparkover timing may in some instances cause limited carryover conduction between positive pulses but deionization is usually achieved during the first oscillator negative half cycle occurring after sparkover. A potentially troublesome condition occurs when the capacitor 20 has been charged to the limiting voltage and remains at that voltage during an open circuit condition. Discharge may thereafter occur with equal probability at any time during the timing cycle represented by the oscillator link voltage.

Looking, for example, to the instance of sparkover at the beginning of pulse 3, the full charge of the storage capacitor 20 plus all the energy of the positive charging pulse must be dissipated. This results in a negative voltage on the capacitor 20 (FIG. 5b) and a negative gap current (FIG. 5e) for a portion of the oscillator blocked half cycle following pulse 3. However, the current is normally deionized before the application of pulse 4. In another illustrated example, where breakdown occurs shortly before the application of positive pulse 10 following brief open circuit conditions, the energy discharge is increased by the energy directly from the link source during source 10. However, the discharge oscillation period is less than that of the source and prevents the discharge from being prolonged. The negative discharge current swing through the gap is completed well before the end of the blocked half cycle following pulse 10 as shown in the figures.

Other conditions are illustrated in the course of breakdown or sparkover during positive pulses 4, 5, 6, 7, and 8. Usually, sparkover can be expected to occur before the capacitor voltage reaches its available peak value. However, as in pulse 4, breakdown may occur at the peak of the link voltage with a possible negative gap current carryover to pulse 5. In such a case, the shorter period of the resonant discharge frequency causes the capacitor voltage to swing positive earlier in time than does the applied oscillator link voltage during pulse 5. Deionization of the spark gap at the end of the early current pulse accompanying pulse 5 is assured. The normally expected situation during applied pulse 8 illustrates breakdown before the capacitor voltage has reached the available peak. In such instance, gap deionization promptly follows the positive pulse, leaving a full half-cycle period before the application of pulse 9. The circuit operates in this manner during the major portion of the machining operation.

It will be appreciated from a comparison of simultaneous voltages and currents in FIGS. 5a through 5e that, for either early or late sparkover during a charging pulse, some combination of the already stored energy of capacitor 20 and the remaining energy of charging pulse is effective to produce a positive discharge pulse through the gap.

*Short Circuited Gap*

In the event that the gap becomes short circuited, as may occur when it is bridged by dislodged particles, perpetuation of a thermal arc and welding of the tool to the workpiece must be avoided.

Pulses 11 and 12 represent such a short circuit period during which the gap voltage of FIG. 5d is zero because there is, in effect, no gap. With the discharge circuit frequency near that of the oscillator, the capacitor is discharged as it is charged, the voltage curve following that of the loaded oscillator link as shown in FIG. 5b. The gap current in FIG. 5e follows a similar curve. Peak currents through the short-circuited electrodes are advantageously somewhat lower than the normal peak cutting currents. This advantage stems from the fact that the short circuit current, as shown in FIG. 5e, is distributed over the full cycle of the 40-kilocycle source frequency rather than concentrated in the shorter half-cycle period of the higher resonant discharge frequency. Oscillatory voltages in the energy storage capacitor causes small reverse currents to flow during negative half cycles of the source while the gap remains short circuited. However, no current from the source can flow in the discharge circuit during the blocked negative half cycles.

Figure 4:
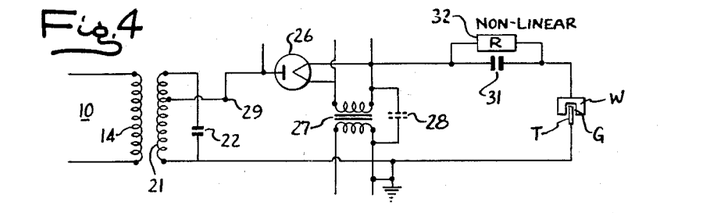
FIG. 4 is another version of the FIG. 3 apparatus as modified for still finer finish cutting.

*Description of the Apparatus of FIGS. 3 and 4*

For fine-finish cutting or small hole machining superior in speed and quality to that obtained merely by reducing the storage capacitance in the apparatus of FIGS. 1 or 2, the apparatus of FIGS. 3 and 4 is employed. It offers particular advantages, especially by way of limiting the short circuit currents. It will be appreciated that for such machining, small energy discharges are required, and any thermal or welding-type damage seriously detracts from the machining requirements.

In FIG. 3, the charging circuit may be that of FIG. 1 in which an oscillator 10 has a tank coil 14 to which is coupled link winding 21. For finish cutting requirements, the peak voltage at the link has been in actual instances selected as 250 volts (as compared with the 450 volt tap of the FIG. 2 rough-cutting apparatus). The capacitor 20 value is reduced, suitably by a factor of ten or more.

In accordance with the invention, the major departure of the FIG. 3 apparatus from that previously described is the addition of a second capacitor 31 in series with the spark gap G in the discharge circuit. Such a series capacitor limits the discharge from the storage or shunt capacitor 20, post-sparkover equilibrium being reached after the shunt capacitor 20 has discharged to the intermediate voltage level to which it charges the series capacitor 31. This equilibrium voltage is smaller than that required to maintain gap ionization.

To prevent the equilibrium voltage from rising and the differential voltage between the capacitors from decreasing with each successive discharge, means for limiting the series capacitor voltage is essential. The voltage limiting means is preferably and simply a resistor 32 connected across the series capacitor and which is non-linear in the sense that its resistance decreases when the voltage across it increases. As a voltage regulator its effective switching potential is selected to limit the series capacitor voltage to a value approximately equal to or less than the single-discharge equilibrium voltage resulting from discharge of the shunt capacitor into an uncharged series capacitor. As a leakage resistor, resistor 32 also decreases the charge stored in series capacitor 31 in the period between discharges. A "Thyrite" resistor such as resistor 30 of FIG. 2 has been found suitable. For example, where two units in series were used as the voltage limiting resistor 30 in an equipment representing the fast cutting position of FIG. 2, the same two units were connected in parallel as resistor 32 in the FIG. 3 or 4 circuit. Its function and selection is further described in the description of the circuit operation.

The capacitances of the series and shunt capacitors are desirably the same for optimum balance of efficiency and short-circuit protection. The single discharge equilibrium voltage is then a fraction of the peak voltage to which capacitor 20 is charged. The analysis of the discharge circuit depends somewhat upon the value and location of distributed inductances. However, the resonant frequency, as viewed from the terminals of capacitor 20 to which the charging source is connected, is desirably high relative to the oscillator frequency. No attempt is made to match or nearly match the two frequencies. Of course, the gap G when not conducting presents a series capacitance but this capacitance is so small as not to result in any substantial charge of the series capacitor 31 during charging of the shunt capacitor 20.

Accordingly, before discharge occurs, there is no substantial voltage across the series or capacitor 31 and the voltage across the gap is essentially that across the shunt capacitor 20. A high resistance path across the gap may be present in the form of an input circuit for the tool feed control (not shown) but as such would not eliminate the voltage across the gap in view of the lower resistance path of the leakage resistor 34. Most significantly shunt circuit current is positively limited since the capacitor 31 and resistor 32 are at all times interposed between the spark gap and the oscillator or other power source.

While the series capacitor 31 may also be made smaller than the shunt capacitor to further limit the discharge, this has not been found to be advantageous since it reduces the level to which the shunt capacitor is discharged. In effect, the useful shunt capacitance remains the same as the series capacitance. A series capacitance which is large relative to the shunt capacitor discharges the latter more completely, but at the expense of short-circuit current limiting relative to the normal cutting current. Thus peak short circuit currents would be likely to be higher instead of lower than peak cutting currents.

A modification representing an ultimate fine finish equipment arrangement again employing a series limiting capacitor 31 is illustrated in FIG. 4. No separate shunt capacitor is employed. Its function is served by the distributed or inherent capacitance 28 of the filament transformer 27 for the rectifying diode or diodes 26. This capacitance was found in an exemplary installation to be 0.02 microfarad, and the same value was selected for the series capacitor 31.

Since a very fine finish is sought with the small capacitances 28 and 31 in FIG. 4, the link voltage may be decreased. In one such installation, the tap 29 was selected to apply a 200 volt peak voltage from the oscillator which, under load conditions, sufficed to charge the capacitance 28 to about a 100 volt average.

*Operation of the Apparatus of FIGS. 3 and 4*

Figure 6A:
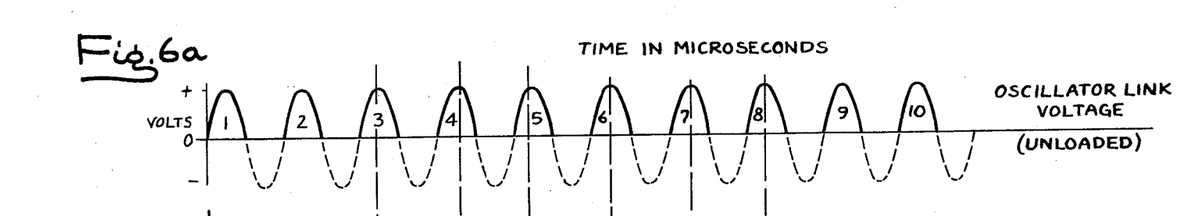
FIGS. 6a–e compare the FIG. 3 circuit oscillator voltage, shunt capacitor voltage, series capacitor voltage, gap voltage, and gap current, respectively, over a wide range of operating conditions.

The curves of FIGS. 6a–6e illustrate the operation of apparatus of the type illustrated in FIGS. 3 and 4 and are particularly drawn for circuit conditions mentioned in the description of the FIG. 3 apparatus. These conditions include a 250 volt applied peak voltage from the 40 kilocycle link, and 0.5 microfarad capacitances of capacitors 20 and 31. As in FIG. 5a, FIG. 6a illustrates a sequence of oscillator cycles of which the forward half cycles or charging pulses are sequentially numbered 1 to 10.

*Open Circuit Conditions*

Figure 6B:
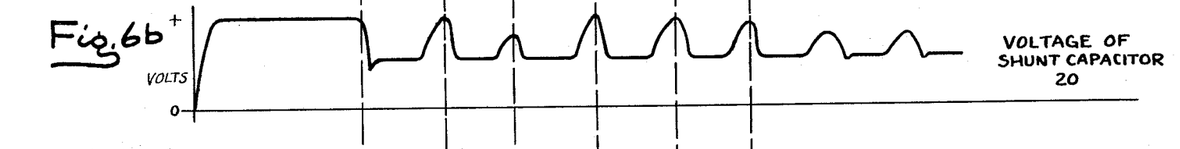

The first two half cycles or pulses 1 and 2 of FIGS. 6a–6e represent open circuit conditions during which no sparkover occurs. Because the value of the shunt capacitor 20 is relatively small in the fine cutting circuits, the voltage across the shunt capacitor 20 rises to substantially maximum value from zero during pulse 1 as shown in FIG. 6b. The capacitor voltage thus follows the link voltage less the voltage drop across the rectifier 25.

Figure 6C:
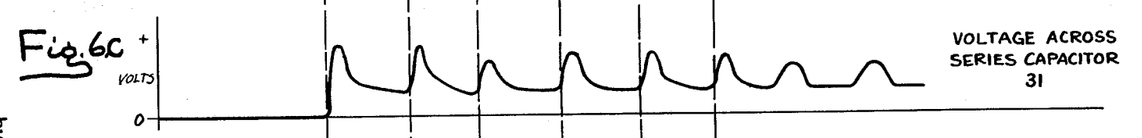
Figure 6D:
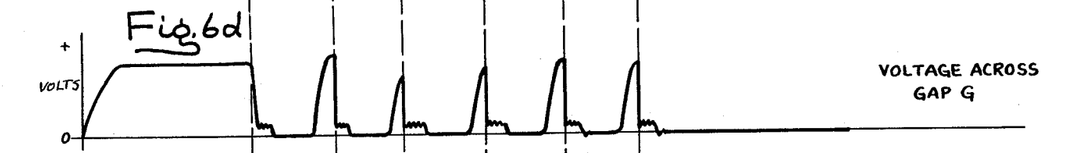

During the open circuit pulses only a negligibly small voltage appears across the series capacitor 31, and in absence of gap leakage paths or gap and wiring capacitances, no voltage at all would be expected, as confirmed by FIG. 6c. This assumes that any charge previously stored on capacitor 31 has been dissipated, due to longer periods of no operation or open-circuit conditions. Under these conditions, open circuit voltage approaching that across shunt capacitor 20 appears across the gap G as shown in FIG. 6d.

*Normal Cutting Conditions*

Sparkover occurring in pulses 3 to 8 illustrates normal cutting conditions when the spark gap is adjusted within the range of normal spacing. Spacings are typically small for fine cutting and the discharges have been found to occur fairly consistently near the peak of the voltage applied to the gap. When the discharge resonance period is much less than the oscillator period, no carryover oscillatory trains between pulses have occurred.

As shown in FIG. 6b, the shunt capacitor voltage rises during charge to a value over 200 volts and then falls very rapidly upon sparkover to an equilibrium level of about 100 volts. FIGURE 6c shows that the voltage on capacitor 31 does not rise slowly until the equilibrium voltage is reached but instead rises rapidly upon sparkover to overshoot the equilibrium value. The peak voltage across the series capacitor 31 is rapidly reduced, however, with minimum of oscillation time in view of the very low discharge time constant of the capacitor 31-resistance 32 combination. During the overshoot period the resistance is very low since the applied voltage is above the effective switching potential. The gap voltage, as shown in FIG. 6d, during pulses 3 to 8, drops to a low ionization potential, typically in the order of 20 to 30 volts. When the voltages of the two capacitors reach a steady state level with a voltage differential less than the gap ionization voltage, the gap is deionized and the discharge is terminated.

Figure 6E:
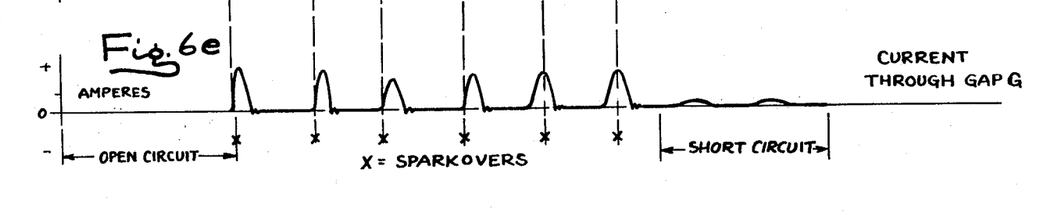

The gap current, shown in FIG. 6e, has a principal discharge pulse during which the workpiece is positive with respect to the electrode tool. A smaller negative pulse may follow (not shown) but any oscillatory tendency is rapidly damped.

After the discharge current has terminated, the voltage on capacitor 31 decreases in the relatively long interval between discharge periods because of the leakage resistance path afforded by the shunt resistor 32. At such applied voltages, the resistance is relatively high and the voltage decrease is limited (to a level near 60 volts as shown in FIG. 6c) so that the differential voltage between the capacitors does not reach a gap sparkover level before the next source pulse is applied. This series capacitor voltage decreases the gap voltage at any instant during the application of a source pulse for given capacitance and charging voltage levels.

Short Circuited Gap

FIG. 6e illustrates a very important advantage accompanying the uniform fine finish cutting of the FIG. 3 (or FIG. 4) circuit during pulses 9 and 10 and peculiarly resulting from the novel circuit structure. Short circuit current through the gap is limited by the capacitor 31 in series with the source and gap. While the resistance 32 can decrease to a very low value, short circuit current is never limited by that resistance alone. This follows from the fact that the resistor 32 has a low value permitting high current flow only when a relatively high voltage appears across capacitor 31. Short circuit current is effectively limited to that produced by the difference between the instantaneous applied voltage and a capacitor voltage having a given minimum value (in this case, about half the no-load voltage of the source).

With the capacitors 20 and 31 in parallel during short circuit, their voltage rises and falls more slowly than when the gap G is subject to sparkover. Charging current through the tool T and workpiece W is thus less than discharge current during normal cutting. The current through the gap is always proportional to the instantaneous voltage across capacitor 20 less the voltage appearing across the capacitor 31. Since the non-linear resistor 32 has a high resistance until the voltage across its terminals reaches the potential at which it effectively switches, the current through the short circuited gap is limited to a safe value throughout the charge cycle. In the absence of the abrupt change of conditions caused by sparkover, the resistor 32 is very effective in damping oscillations and forestalling reverse current flow during negative half cycles.

The overall effect is to limit short circuit peak current through the workpiece to a value much less than the normal peak cutting current. Part of the energy is dissipated in the resistor 32. This automatic selective control completely prevents short circuit damage of the workpiece machined surface. Pulses 9 and 10 of FIG. 6a, as reflected in the current pulses of FIG. 6e illustrate the condition described. In addition to the peak current limitation, the short-circuit average current as well as the peak current is decreased by use of the series capacitor circuit since, in effect, a substantial voltage is always subtracted from the source voltage applied across the gap electrodes.

Various modifications of the apparatus of FIGS. 3 and 4 preserving all or some of the operational advantages may be made without departing from the spirit of the invention. For example, the resistance 32 may be selected to discharge the series capacitor 31 during intervals between discharges. Various power sources may supply the shunt capacitor 20 and still maintain the usefullness of the series capacitor 31. For example, a direct current or pulsating voltage may be applied through a suitable charging impedance, for a relaxation mode of oscillation in which the capacitor 20 charges until sparkover and the charging impedance limits the flow of current from the source during discharge. In such a case, the charging impedance need not be the resistance of rectifier 23 but may be an inductor or resistor.

We claim as our invention:

1. A spark machining apparatus for dislodging particles from a conductive workpiece by a series of short, time-spaced over-voltage initiated discharges through an ionizable dielectric fluid-filled spark gap between the workpiece and an electrode tool which apparatus comprises an alternating current source having a frequency equal to the desired discharge repetition rate, a storage capacitor, unidirectionally conducting means, charging circuit means for coupling said capacitor through said unidirectional conducting means to provide a voltage across said capacitor only during alternate half cycles of the source, and discharge circuit means connecting the capacitor across the electrode tool and workpiece to initiate discharges when the voltage thereacross reaches a sufficient level, said discharge circuit means incorporating inductance providing with the capacitor a resonant discharge circuit frequency during discharge which is higher than said source frequency.

2. In a spark machining apparatus for dislodging particles from a conductive workpiece by a series of time-spaced over-voltage initiated discharges through an ionizable dielectric fluid-filled normal spark gap spacing maintained between the workpiece and an electrode tool, a high frequency oscillator, a storage capacitor, unidirectional conductive means, charging circuit means for coupling said oscillator across said capacitor and through said unidirectional means to provide a voltage across the capacitor only during alternate oscillator half cycles, and discharge circuit means for maintaining the capacitor connected across the spark gap to initiate a discharge whenever the gap voltage reaches a sufficient level, the discharge circuit inductance being limited to provide a resonant discharge frequency only slightly higher than the oscillator frequency.

3. A spark machining apparatus for dislodging particles from a conductive workpiece by a series of time-spaced sparkover discharges through an ionizable dielectric fluid-filled normal spark gap spacing maintained between the workpiece and an electrode tool, comprising an oscillator having a given frequency and voltage, a storage capacitor, charging circuit means including a half-wave rectifier for coupling said oscillator across said capacitor to partially charge the capacitor during each alternate oscillator half cycle, discharge circuit means maintaining the capacitor connected across the spark gap for discharge whenever the sparkover occurs, and voltage regulating means for limiting the capacitor voltage charge in the event sparkover does not occur before the succeeding alternate half cycle.

4. The apparatus of claim 3 in which said half wave rectifier comprises a bank of parallel connected vacuum diodes in circuit between said oscillator and said capacitor.

5. The apparatus of claim 3 in which said oscillator has a tuned output primary circuit tank and an adjustable inductance secondary circuit link coupled thereto.

6. A spark machining apparatus having an ionizable fluid-filled spark gap defined between an electrode tool and a conductive workpiece subject to sparkover discharge within a range of applied voltages from an alternating voltage source having a frequency equal to the desired repetition rate comprising, a first storage capacitor, means for applying a charging voltage from the source across the capacitor only during alternate half cycles of the source, a second capacitor, means connecting said gap and said second capacitor in series across said capacitor to discharge the first capacitor into the second capacitor when the gap voltage reaches a sparkover value, and means for preventing the charge of the second capacitor from accumulating over successive half cycles.

7. The apparatus of claim 6 in which the last named means in a non-linear resistance connected across the second capacitor and through which the current increases as a plural exponent of the voltage across the second capacitor.

8. In a spark machining apparatus having an ionizable fluid-filled spark gap defined between an electrode tool and a conductive workpiece subject to sparkover discharge within a range of applied voltages, a high frequency oscillator having a frequency equal to the desired repetition rate, a first storage capacitor, a half-wave rectifying means connecting said voltage source across said capacitor through said rectifier for applying a charging voltage across the capacitor during alternate half cycles of the source, a second capacitor, means connecting said gap and said second capacitor in series across said first capacitor to partially discharge the first capacitor into the second capacitor when the gap voltage reaches a sparkover value, and voltage regulating means for limiting the voltage of said second capacitor to a value substantially less than the voltage of the source.

9. In a spark machining apparatus for dislodging particles from a conductive workpiece by a series of time-spaced sparkover discharges through an ionizable dielectric fluid-filled normal spark gap spacing maintained between the workpiece and an electrode tool, first and second energy storage capacitors, means connecting the second capacitor and the gap in series across the first capacitor, means for applying a voltage across said first capacitor to initiate sparkover and discharge of the first capacitor into the second capacitor through the ionized gap, and means for limiting the charge stored by the second capacitor to a voltage level below the voltage applied to the first capacitor.

10. In a spark machining apparatus for dislodging particles from a conductive workpiece by a series of time-spaced sparkover discharges through an ionizable dielectric fluid-filled normal spark gap spacing maintained between the workpiece and an electrode tool, first and second energy storage capacitors, means connecting the second capacitor and the gap in series across the first capacitor, a charging impedance, a unidirectional voltage source, means for connecting the voltage supply through the impedance across said first capacitor to initiate sparkover and discharge of the first capacitor into the second capacitor through the ionized gap, and means for limiting the residual voltage of said second capacitor to a level substantially below the voltage applied to the first capacitor.

11. In a spark machining apparatus for dislodging particles from a conductive workpiece by a series of time-spaced sparkover discharges through an ionizable dielectric fluid-filled normal spark gap spacing maintained between the workpiece and an electrode tool, an oscillator, a first storage capacitor, unidirectional conductive means, charging circuit means for coupling said oscillator across said capacitor and through said unidirectional means to provide a voltage across the first capacitor only during alternate oscillator half cycles, a second storage capacitor and discharge circuit means connecting the second capacitor and the spark gap in series across the first capacitor to initiate a discharge into the second capacitor whenever the gap voltage reaches a sparkover level, and a non-linear voltage regulating impedance shunting the second capacitor for limiting the residual voltage charge on second capacitor, the first and second capacitors having substantially equal capacitances.

12. In a spark machining apparatus for dislodging particles from a conductive workpiece by a series of time-spaced sparkover discharges through an ionizable dielectric fluid-filled normal spark gap spacing maintained between the workpiece and an electrode tool, an oscillator, a charging circuit including a unidirectional conductive means connecting said capacitor across the oscillator output voltage only during oscillator alternate half cycles, a second storage capacitor, discharge circuit means connecting the spark gap and the second capacitor in series across the first capacitor to initiate a discharge into the second capacitor whenever the gap voltage reaches a sparkover level, the discharge circuit inductance being limited to provide a resonant discharge frequency higher than the frequency of the oscillator, and a non-linear voltage regulating impedance shunting the second capacitor for limiting the residual voltage charge on the second capacitor.

13. In spark cutting apparatus for providing sparkover discharges through a spark gap defined between a conductive workpiece and tool electrode, a first capacitor, charging means for connecting the first capacitor to a charging voltage source, a second capacitor, and discharge circuit means connecting a spark gap in series with the second capacitor across the first capacitor to provide a spark cutting discharge when the gap is normally spaced and to limit current from the source when the gap is short circuited, and resistance means shunting the second capacitor.

14. A spark cutting apparatus for limiting short circuit currents through a workpiece and tool electrode to a value below sparkover discharge currents when the workpiece and tool electrode define a spark gap between them comprising a first capacitor connected to a charging voltage source, and a second capacitor connected in series with the spark gap across the first capacitor, said second capacitor being shunted by a voltage-limiting resistor.

15. In a spark machining apparatus having a storage capacitor charged from a voltage source and discharged by sparkover through a spark gap defined between a conductive workpiece and electrode tool, means for limiting current flow through the workpiece in the event the spark gap becomes short circuited comprising a second capacitor connected in series with the spark gap and non-linear resistor shunting said second capacitor to limit its voltage.

16. A spark-machining apparatus for dislodging particles from a conductive workpiece by a series of time-spaced spark-over discharges through an ionizable dielectric fluid-filled normal spark gap spacing maintained between the workpiece and an electrode tool, comprising an oscillator having a given frequency and voltage, a storage capacitor, charging circuit means including a half-wave rectifier for coupling said oscillator to partially charge the capacitor during each alternate oscillator half cycle, discharge circuit means for maintaining the capacitor connected across the spark gap for discharge therethrough whenever spark-over occurs, and a non-linear resistance in which the current increases as a plural exponential power of the voltage across it for limiting the capacitor voltage charge in the event spark-over does not occur before the succeeding half cycle.

17. A spark machining apparatus for dislodging particles from a conductive workpiece by a series of time-spaced over-voltage initiated discharges through an ionizable dielectric fluid-filled normal spark gap spacing maintained between the workpiece and an electrode tool, an electronic oscillator having an output circuit selected for resonance at a given high frequency, a winding inductively coupled to said output circuit, a storage capacitor, unidirectional conductive means, means connecting said winding and unidirectional conductive means in series across said capacitor to charge the capacitor only during alternate oscillator half cycles, and discharge circuit means connecting the capacitor across the spark gap to initiate a discharge whenever the gap voltage reaches a sufficient level, the discharge circuit inductance being selected to provide a resonant discharge frequency circuit slightly higher than the oscillator frequency.

18. A spark machining apparatus for dislodging particles from a conductive workpiece by a series of time-spaced over-voltage initiated discharges through an ionizable dielectric fluid-filled spark gap maintained between the workpiece and an electrode tool, comprising an electronic oscillator having an output circuit tunable to a selected high frequency, a voltage step-down transformer having primary and secondary windings, said primary winding being the output circuit inductance of said oscillator, a half wave rectifier, a storage capacitor, means connecting said secondary winding and said rectifier in series across said capacitor to charge the capacitor during alternate oscillator half cycles, and discharge circuit means connecting the capacitor across said spark gap to initiate a discharge whenever the gap voltage reaches spark-over level, the discharge circuit inductance being limited to provide a resonant discharge circuit frequency higher than the oscillator frequency.

19. The apparatus of claim 18 in which the time constant defined by the product of the resistance of the half-wave rectifier and the capacitance of the storage capacitor is less than one half the period at said given frequency.

20. A spark-machining apparatus for dislodging particles from a conductive workpiece by a series of time-spaced spark-over discharges through an ionizable dielectric fluid-filled normal spark gap spacing maintained between the workpiece and an electrode tool, comprising an oscillator having a given frequency for producing a signal of a given high frequency and amplitude with respect to ground, a storage capacitor, an electric discharge device rectifier having an anode and a heated cathode, means for heating the cathode including a transformer with a secondary winding connected for heating the rectifier cathode and a primary winding connected to an alternating voltage source referenced to ground, said transformer having distributed capacitance between its primary and secondary windings so as to define a given first capacitance between the rectifier cathode and ground chargeable during alternate half cycles of said oscillator signal, circuit means connecting said anode to one terminal of said oscillator output terminal whereby said capacitance is charged during alternate half cycles, a second capacitance having the same order of magnitude as the first capacitance, and discharge circuit means connecting the first and second capacitances in series across the spark gap for discharge therethrough whenever spark-over occurs.

21. The apparatus of claim 20 in which the second capacitance is shunted by a non-linear voltage limiting resistance for limiting the maximum discharge current through the gap in the event spark-over does not occur during each of said alternate half cycles.

22. A spark machining apparatus for dislodging particles from a conductive workpiece by a series of time-spaced over-voltage initiated discharges through an ionizable dielectric fluid-filled normal spark gap spacing maintained between the workpiece and an electrode tool, comprising an electronic oscillator having an output circuit tunable to a selected high frequency, a voltage step-down transformer having primary and secondary windings, said primary winding being an output circuit inductance of said oscillator, a half wave rectifier, a first capacitor, means connecting said secondary winding and said rectifier in series across said capacitors to charge the first capacitor during each alternate oscillator half cycle, a second capacitor, discharge circuit means connecting said first and second capacitors in series across the spark gap whereby the first capacitor discharges into the second capacitor upon over-voltage initiation of a discharge through the gap, and a non-linear voltage limiting resistor connected in shunt across the second capacitor.

23. A spark machining apparatus for dislodging particles from a conductive workpiece by a series of time-spaced over-voltage initiated discharges through an ionizable dielectric fluid-filled spark gap maintained between the workpiece and an electrode tool, comprising an electronic oscillator having an output circuit tunable to a selected high frequency, a voltage step-down transformer having primary and secondary windings, said primary winding being the output circuit inductance of said oscillator, a half wave rectifier, a storage capacitor, means connecting said secondary winding and said rectifier in series across said capacitor to charge the capacitor during alternate oscillator half cycles, discharge circuit means connecting the capacitor across said spark gap to initiate a discharge whenever the gap voltage reaches spark-over level, the discharge circuit inductance being limited to provide a resonant discharge circuit freuency higher than the oscillator frequency, and a nonlinear voltage-limiting resistor connected across the storage capacitor.

References Cited in the file of this patent
UNITED STATES PATENTS

| | | |
|---|---|---|
| 2,544,477 | West | Oct. 6, 1951 |
| 2,628,330 | Williams | Feb. 10, 1953 |
| 2,794,152 | Matulaitis | May 28, 1957 |
| 2,827,595 | Bruma et al. | Mar. 18, 1958 |
| 2,856,565 | Matulaitis | Oct. 14, 1958 |
| 2,876,386 | Fefer et al. | Mar. 3, 1959 |
| 2,886,693 | Harris et al. | May 12, 1959 |
| 2,895,080 | Branker | July 14, 1959 |

FOREIGN PATENTS

| | | |
|---|---|---|
| 570,338 | Italy | Dec. 7, 1957 |
| 843,348 | Great Britain | Aug. 4, 1960 |